Oct. 5, 1926.
N. A. CHRISTENSEN
1,601,906
TRIPLE VALVE AIR BRAKE APPARATUS FOR TRAINS
Filed Nov. 28, 1924
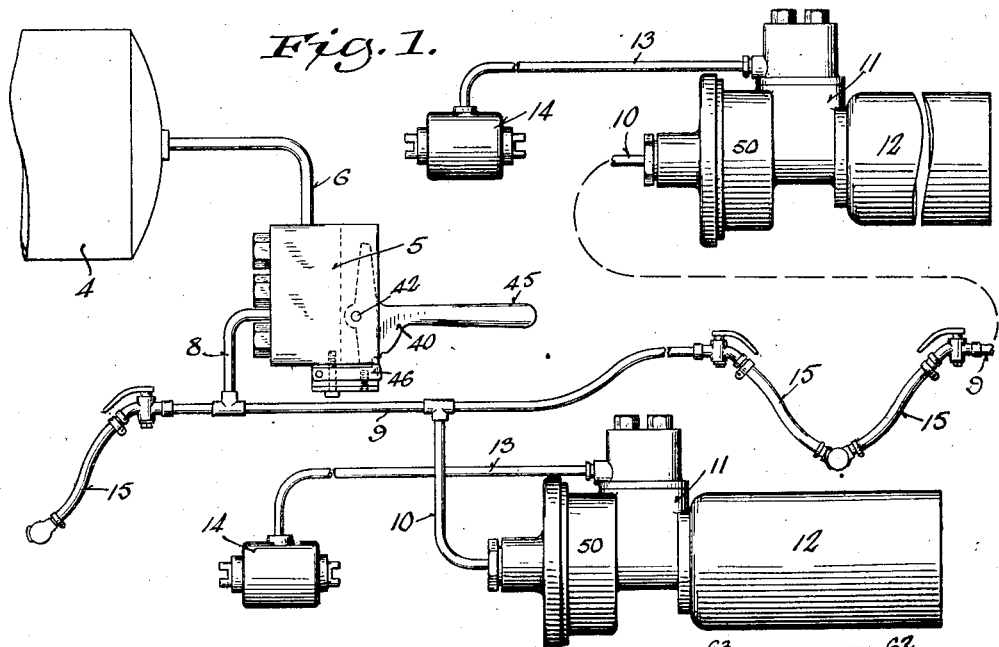
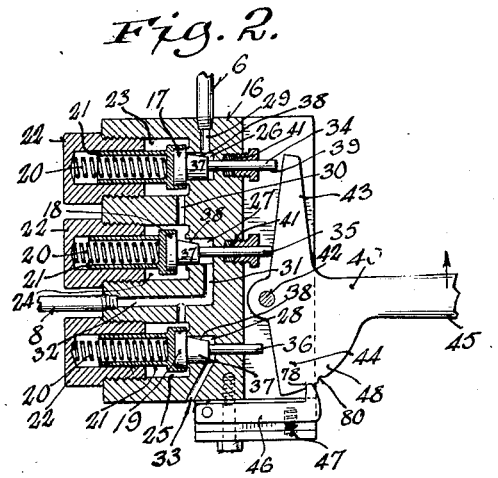
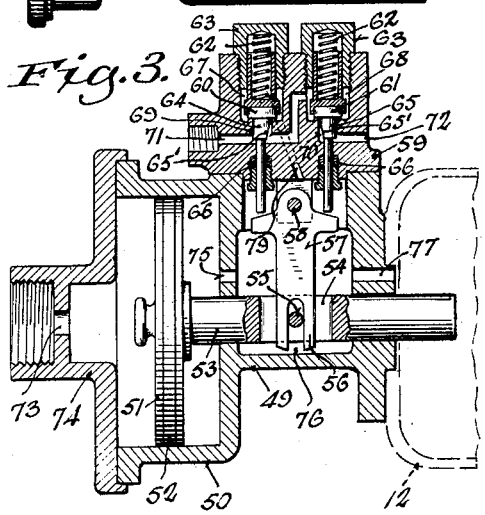
INVENTOR.
NIELS A. CHRISTENSEN.
BY
Quarles & French
ATTORNEYS.

Patented Oct. 5, 1926.

1,601,906

UNITED STATES PATENT OFFICE.

NIELS A. CHRISTENSEN, OF MILWAUKEE, WISCONSIN.

TRIPLE-VALVE AIR-BRAKE APPARATUS FOR TRAINS.

Application filed November 28, 1924. Serial No. 752,680.

The invention relates to brake systems for trains, and more particularly automotive vehicle trains, which include the main automotive vehicle and the trailers pulled thereby.

With automotive vehicle trains I have found that the usual air brake equipment used in connection with railroad trains cannot be used satisfactorily, and the principal object therefore of the present invention is to provide an improved system including novel triple valve mechanism and control valve mechanism which will and does operate satisfactorily on automotive vehicle trains under the operating conditions encountered.

The invention further consists in the several features hereinafter set forth and more particularly defined by claims at the conclusion hereof.

In the drawings: Fig. 1 is a diagrammatic view of the air brake system embodying the invention;

Fig. 2 is a vertical sectional view through the control mechanism;

Fig. 3 is a vertical sectional view through the triple valve mechanism.

In the drawings the numeral 4 designates the main reservoir, 5 the control valve mechanism, 6 a pipe connecting the main reservoir with said mechanism, 8 a pipe connecting said valve mechanism with the train pipe 9, 10 a pipe connecting the train pipe 9 with one of the triple valve mechanisms 11, 12 the auxiliary reservoir, and 13 a pipe connecting the triple valve mechanism with one of the brake cylinders 14. As is well understood, the main reservoir and the control valve mechanism are mounted on the main or hauling automotive vehicle, the reservoir receiving its air from a compressor driven by the engine of the vehicle, and the train pipe 9 is made in sections, one for each trailer, which sections are connected together and to the pipe 8 by suitable flexible couplings 15. The automotive hauling vehicle and the trailers are each provided with brake cylinders associated with one or both sets of wheels and with the triple valve mechanism for controlling its own brakes, one brake cylinder and triple valve mechanism being shown for the vehicle itself and another for one of its trailers.

The main control valve mechanism comprises a housing 16, which is preferably mounted on the steering column of the hauling vehicle, and three valves 17, 18 and 19, urged to their seats by springs 20. Each valve has a tubular portion 21 slidably mounted in the bore of a box-nut 22 with its spring mounted in said tubular portion between the end thereof and the end of the bore in said nut. The valves 17, 18 and 19, respectively, work in chambers 23, 24 and 25, which respectively communicate, when the valves are open, with bores 26, 27 and 28. The bore 26 is connected by a duct 29 with the pipe 6. The chambers 23 and 24 communicate with each other through a duct 30. Communicating passages 31 and 32 connect the bore 27 with the chamber 25 and passage 31 also connects with the pipe 8 communicating with the train pipe. The bore 28 is connected with atmosphere through a duct 33. The valves 17, 18 and 19 are opened by the respective inward movement of pins 34, 35 and 36. Each of these pins is similarly constructed with a cylindrical head portion 37 having one side 38 milled flat on a taper to provide for a gradual increase of port opening as the valve which it controls is opened. The stems 39 of these pins project through bores in the casing 16 and beyond the same for engagement by an operating lever 40. The stems of the pins 34 and 35 are preferably packed by suitable stuffing boxes 41. The valve 19 is the relief or exhaust valve, while the valves 17 and 18 are inlet valves.

The operating lever 40 is pivoted intermediate its ends at 42, has an arm 43 adapted to engage the pins 34 and 35 and another arm 44 to engage the pin 36, and a handle 45. This lever may be held in various positions, as hereinafter described, by means of a pivoted detent or pawl 46 urged by a spring 47 into engagement with a notched quadrant or sector 48 on the lever.

Each triple valve mechanism comprises a housing 49 including a cylinder 50 in which the valve-operating piston 51 works. This piston is provided with the usual packing ring 52 and its rod 53 works through the rear end of the cylinder 50 and is slotted at 54 intermediate its ends and provided with a cross-pin 55. The depending slotted end 56 of a T-headed lever 57 engages this pin 55 within the slotted portion of said rod and is, therefore, moved by the piston 51.

The lever 57 is mounted on a fulcrum pin 58 carried by a depending part of a valve housing 59 containing valves 60 and 61, urged to their seats by springs 62 mounted between the tubular parts of said valves and the box-nuts 63. These valves 60 and 61 are respectively operated by pins 64 and 65, which are similar in constructional details to the pins previously described, so that a gradual release or exhaust of air may be effected through the tapered faces 65' of said pins. The stems of said pins are preferably packed by suitable stuffing boxes 66. The valves 60 and 61 are held tightly to their seats by their springs unless opened by the lever 57 whose arms upon the swinging of said lever by the piston 51 and its rod are adapted to alternately open and close said valves by movement of the operating pins 64 and 65. The housing 59 is securely mounted in an air-tight manner upon the housing 49. The valves 60 and 61, respectively, work in chambers 67 and 68 which communicate respectively, when the valves are open, with bores 69 and 70. The bore 69 communicates with a passage 71 leading to the brake pipe 13 and to the chamber 68, and the bore 70 communicates with a duct 72 leading to atmosphere.

Train pipe pressure is introduced into the forward end of the cylinder 50 through the connection of pipe 10 to apertured end 73 of the cover 74 for the cylinder 50. The rear end of the cylinder communicates with the auxiliary reservoir 12 through the port 75, chamber 76 and port 77. There is sufficient leakage between the cylinder 50 and the piston 51 to allow compressed air from the train pipe to pass around said piston through the passages just mentioned to the auxiliary reservoir 12 to fill it with air to the same pressure as that in the train pipe.

The valve 17 is provided with a comparatively strong spring 20 so that when not opened by the lever 40 it will remain tightly seated. The handle 45 in this position, as shown in Fig. 2, being held by a notch 78 engaged by the pawl 46. In this position the valve 18 will be held open by the lever 40, with a tendency of its spring 20 to close it when the lever 40 is released from its operating pin 35. The valve 17 is used to retain an excess of pressure of the air in the main reservoir 4 over and above that in the train pipe 9 for the purpose of creating a difference in pressure between the main reservoir and train pipe, and to insure a positive release of the triple valves when the lever 40 is moved in the direction of the arrow to hold the valve 17 open. This need only be for a sufficient length of time to cause a complete release of all triple valves through the introduction of air at main reservoir pressure to the train pipe 9 and hence to the forward end of the cylinder 50, causing the piston 51 to travel toward the right, thereby swinging the levers 57 so as to move pins 65 to open the relief valves 61 for the whole train, thereby permitting the pressure of the air in the air brake or cylinders to fall to atmosphere and release the brakes. As soon as this occurs the handle 45 is released and the spring for the valve 17, being comparatively strong, moves the handle so as to have the pawl 46 drop into the running position, shown in Fig. 2, allowing the valve 18 to remain open and then for any air at main reservoir pressure going into the train line past said valve 17 there would still be a constant difference of pressure between the main reservoir and train pipe determined by the spring load on the valve 17 which may be adjusted to suit operating conditions.

Where a brake application is desired, the handle 45 is moved in the direction, from neutral, opposite to that of the arrow, which first causes the valve 18 to close and be held closed both by its spring and the main reservoir pressure and thereafter the moving of the pin 36 and opening of the valve 19 causes a portion of the air in the train pipe 9 to escape to atmosphere through the port 33 causing a train pipe reduction of, for instance, six to eight pounds. This unbalances the pressure between the train pipe and the auxiliary reservoir 12, so that the pressure of the air in the auxiliary reservoir will cause the piston 51 to travel toward the left, operating the lever 57, which allows valve 61 to be seated by its spring and thereafter opens valve 60 by the engagement of the lever 57 with the pin 64, whereupon compressed air from the reservoir 12 passes through port 77, chamber 76, a passage connecting chamber 76 with the chamber 67, thence past the valve 60 through bore 69 to passage 71 and thence through pipe 13 to the brake cylinder 14. Thus compressed air flows from the auxiliary reservoir to the brake cylinder, thereby reducing the auxiliary reservoir pressure until the pressure between the auxiliary reservoir and the brake cylinder is again balanced or is slightly in excess on the train pipe side when the triple valve piston 51 will again move to the right but will of its own accord stop before it has traveled far enough to cause the lever 57 to operate pin 65 to open valve 61, the pressure on which, in the meantime, has been increased over the pressure of its spring by the pressure of the air in the brake line which has also entered the chamber 68 through the passage 71. If it is desired to apply the brake still harder, another slight train pipe reduction is made by again operating the valve 19 and the valve 60 will again open and more air will be admitted to the brake line to increase the pressure therein.

However, the brakes may be held in applied position without either adding or decreasing the pressure by moving the lever 40 in a direction to make a brake application until the arm 43 is free of the pin 35 for the valve 18, and the arm 44 has not yet engaged the pin 36 for the valve 19 to a lap position, which may be determined by a notch 80 on the quadrant 44 engaged by the pawl 46.

To release the brake, the train pipe pressure is restored in the manner previously described and the triple valve piston will travel as far to the right as is permitted, at which time the lever 57 has moved the pin 65 to open the exhaust valve 61 and the air in the brake line will escape through passage 71, chamber 68, bore 70 and duct 72 to atmosphere.

From the above it will be noted that there are four principal positions for the operator's lever 40, namely, running, lap, application and release. Each of these positions may be definitely located by a notch in the quadrant but only notches 78 and 80, respectively, for running and lap positions have been shown.

Due to the sensitiveness of the mechanism herein described, it is possible to effect a graduated release of the brake, as well as a graduated application, namely, by restoring the train pipe pressure so as to cause the release valve 61 of the triple valve mechanism to open and then immediately thereafter make another reduction of train pipe pressure, which will cause said valve to close but not necessarily open the inlet valve 60 for admitting more air into the brake cylinder since this inlet valve being of the spring loaded poppet type forms an abutment for the lever 57 to limit the travel of the piston 51 under these conditions. Furthermore, this particular operation can be made positive by making the spring for the valve 60 of such a strength that in addition to the auxiliary reservoir pressure which is acting to hold the valve 60 to its seat this spring pressure will act on said valve so that its operating pin 64 forms a distinct abutment for the lever 57 and hence a limiting stop for the movement of the piston 51.

With this construction the inlet valve 60 and the relief valve 61 take the place of the leaky old style slide valve and graduating valve of the old style triple valve, and it becomes possible to use air at high pressure and in small quantities for operating vehicle trains, as against the established practice in railway practice of using low pressure air in larger quantities where the items of heavy cumbersome parts, waste from leakages and relative inefficiency is disregarded.

It will, of course, be understood that the main control valve mechanism acts to control the triple valve mechanism on each vehicle of the automotive train.

The valve 17 is a pressure reduction valve to maintain a difference in pressure between the main reservoir and the train pipe and auxiliary reservoirs of the triple valve mechanism and insure a positive release; the valve 19 is the control or train pipe reduction valve which effects the brake application action of the triple valve mechanisms; while the valve 18 effects the release movement of the triple valve mechanisms to release the brakes.

A detailed showing of the brake mechanism has not been made as any suitable brake mechanism associated with the vehicle wheels may be used in connection with the system above described.

I desire it to be understood that this invention is not to be limited to any particular form or arrangement of parts except in so far as such limitations are specified in the claims.

What I claim as my invention is:

1. In a triple valve mechanism for trains, the combination with the train pipe, the auxiliary reservoir, the actuating piston, and the brake line, of a spring-closed poppet valve controlling the passage of pressure fluid from the auxiliary reservoir to the brake line, a spring-closed poppet valve for controlling the exhaust pressure from the brake line, and means operatively connecting said piston with said valves.

2. In a triple valve mechanism for trains, the combination with the train pipe, an auxiliary reservoir, the actuating piston and the brake line, arranged in operative association, of a spring-closed poppet valve controlling the passage of pressure fluid from the auxiliary reservoir to the brake line, a spring-closed poppet valve for controlling the exhaust of pressure fluid from the brake line, of a means including a lever actuated by said piston for alternately opening and closing said valves.

3. In a triple valve mechanism for trains, the combination with the train pipe, the auxiliary reservoir, the actuating piston and the brake line, arranged in operative association, of a spring-closed poppet valve controlling the passage of pressure fluid from the auxiliary reservoir to the brake line, a spring-closed poppet valve for controlling the exhaust of pressure fluid from the brake line, and means including a push-pin for each valve, and a lever actuated by said piston and alternately engageable with said pins for opening and closing said valves.

4. In a fluid pressure brake system for trains, the combination with the main reservoir, of an auxiliary reservoir, a train pipe connecting said reservoirs, a brake line, a spring-closed poppet valve controlling the passage of pressure fluid from the auxiliary reservoir to the brake line, a spring-closed poppet relief valve for controlling the release of pressure in the brake line, a piston operatively connected to said valves, and means including control valve mechanism for operating said piston to open said inlet valve to make a brake application, to move said piston to open said relief valve, to maintain said piston in a "running position" or to move said piston to a "lap position".

5. In a triple valve mechanism, the combination with the auxiliary reservoir, the train pipe line, and the brake line, of a spring-closed poppet inlet valve for controlling the passage of pressure fluid from said reservoir to the brake line, a spring-closed relief valve for said brake line, and operating means for said poppet valves including a piston operated by differences in the pressure between the train pipe line and the auxiliary reservoir, the spring of said inlet valve being of a strength to permit of a graduated application or graduated release of pressure fluid in the brake line by resistance offered to the operation means.

6. In a triple valve mechanism, the combination with the auxiliary reservoir, the train pipe line, and the brake line, of a spring-closed poppet inlet valve for controlling the passage of pressure fluid from said reservoir to the brake line, an operating pin for said valve, and operating means for said pin including a piston operated by difference in pressure between the train pipe line and the auxiliary reservoir, said pin serving as an abutment to limit the movement of said piston under certain conditions.

7. In a triple valve mechanism, the combination with the auxiliary reservoir, the train pipe line and the brake line, of a spring-closed poppet inlet valve for controlling the passage of pressure fluid from said reservoir to the brake line, an operating pin for said valve provided with means for regulating the passage of air to the brake line, a spring-closed poppet valve for controlling the exhaust pressure from the brake line, an operating pin for said exhaust valve, and operating means for said pins including a piston operated by difference in pressure between the train pipe line and the auxiliary reservoir.

8. In a triple valve mechanism, the combination with the auxiliary reservoir, the train pipe line and the brake line, of a spring-closed poppet inlet valve for controlling the passage of pressure fluid from said reservoir to the brake line, a spring-closed relief valve for said brake line, an operating pin for each valve provided with means for regulating the passage of air to and from the brake line, and operating means for said pins including a piston operated by difference in pressure between the train pipe line and the auxiliary reservoir.

In testimony whereof, I affix my signature.

NIELS A. CHRISTENSEN